United States Patent Office 3,809,695
Patented May 7, 1974

3,809,695
2,6-DICHLORO-3-NITRO-PYRIDINE
Günter Steinmetz and Kurt Thiele, Frankfurt, Germany, assignors to Deutsche Gold- und Silber-Scheideanstalt vormals Roessler, Frankfurt am Main, Germany
No Drawing. Filed Apr. 8, 1968, Ser. No. 719,711
Claims priority, application Germany, Apr. 19, 1967,
D 52,843
Int. Cl. C07d 31/26
U.S. Cl. 260—290 HL                            4 Claims

ABSTRACT OF THE DISCLOSURE 2,6-dichloro-3-nitro-pyridine and its production by reaction of 2,6-dichloropyridine with a mixture of concentrated sulfuric acid and smoking nitric acid under reflux. The 2,6-dichloro-3-nitro-pyridine is useful as a herbicide and also in view of the selective reactivity of the chlorine substituent, it is useful as an intermediate in the preparation of other useful products, such as compounds having analgesic action.

BACKGROUND OF THE INVENTION

It is known that halogen substituted pyridines are very difficult to nitrate and sometimes cannot be nitrated. Nitration products could only be obtained with 3-halogen pyridines by nitration with smoking sulfuric acid and $KNO_3/HNO_3$ at 270° C. with yields lying between 5 and 10%. The 2-halogen and 4-halogen pyridines could not be nitrated at all (E. Klingsberg, Pyridine and Its Derivatives, Part 2, Interscience Publishers, Inc., New York, 1961, p. 476; Roczniki Chem. 18, 1938, pp. 215–6; Chem. Abstracts 33, 1939, 3379). Consequently, 2,6-dichloro-3-nitro-pyridine or a technically usable method for its preparation is not known, even though this compound is of great technical interest in view of the reactivity of halo chlorine atoms which are activated by the nitro group just as is the case with the often described 2,5-dichloro-3-nitro-pyridine, 2-chloro-3-nitro-pyridine or 2-chloro-5-nitro-pyridine.

DESCRIPTION OF THE INVENTION INCLUDING PREFERRED EMBODIMENT

According to the invention it was unexpectedly found that the nitration of 2,6-dichloropyridine proceeds smoothly with very good yields when 2,6-dichloropyridine is heated to boiling under reflux with a mixture of concentrated sulfuric acid and fuming nitric acid (d.=1.5). Expediently, the ratio of concentrated sulfuric acid and fuming nitric acid is selected so that 1–2 volumes of concentrated sulfuric acid are provided for each volume of fuming nitric acid. Expediently, the 2,6-dichloropyridine is dissolved in such mixture and then, for instance, heated to boiling for 1–3 hours.

In the known chloro nitro substituted pyridines, such as 2-chloro-5-nitro-pyridine and 2-chloro-3-nitro-pyridine, the chlorine atoms are of the same mobility when exchanged against basic reaction partners and it was therefore to be expected that both chlorine atoms in 2,6-dichloro-3-nitro-pyridine would possess the same or similar mobility so that upon reaction with amines either both chlorine atoms would be replaced simultaneously or a mixture of both possible mono-substitution products would always be obtained. However, contrary to expectations, it was found that both chlorine atoms of 2,6-dichloro-3-nitro-pyridine are selectively exchanged against primary and secondary amino groups or hydroxyl amines or hydrazines or other compounds containing basic NH groups in that the chlorine atom in position 2, that is, the chlorine atom which is ortho to the nitro group, is always replaced first and only thereafter is the chlorine atom in position 6 replaced.

Such reaction can be carried out in the presence of an acid acceptor, such as, an excess of the reacting amine, tertiary amines, soda, potash and in the presence or absence of a solvent at 0 to 200° C. In such reaction it is of advantage that in the exchange of one chlorine atom it is possible to employ 2 mols of amine per mol of pyridine compound whereby the second mold of amine acts as an acid acceptor without having the chlorine atom in 6 position react. If, on the other hand, both chlorine atoms are to be replaced with the same amino group, it is only necessary to employ correspondingly larger quantities of amine and longer reaction periods.

Primary and secondary aliphatic amines in which the alkyl groups can form a ring which may also contain a further heteroatom, primary and secondary aromatic or aralkyl amines and primary and secondary heterocyclic amines are particularly suited for the reaction.

As has already been indicated, 2,6-dichloro-3-nitro-pyridine has useful herbicidal properties, for instance, when applied to cereals and vegetables in phytotoxic quantities.

In view of the selective reactivity of the chlorine atoms, such compound also represents an important starting material for the production of pharmaceutical products. For instance, when the 2-chloro atom is replaced by an amino group and the 6-chloro atom is replaced by a benzyl amino or a 2-trifluoromethyl benzyl amino group and the nitro group is then reduced with the aid of Raney nickel and the resulting amino group is acylated, for instance, with chloroformic acid ethyl or propyl ester or acrylic chloride, compounds are obtained having strong analgesic properties upon oral administration.

The following example will serve to illustrate the invention.

Example 200 g. of 2,6-dichloropyridine were dissolved in a mixture of 1000 ml. of concentrated sulfuric acid and 600 ml. of fuming nitric acid (d.=1.5) and boiled under reflux for 90 minutes (temperature 105–107° C.). After cooling the reaction mixture was poured on ice and neutralized at 0° C. with concentrated ammonia. After filtering and drying, 195 g. of 2,6-dichloro-3-nitro-pyridine were obtained. After recrystallization from the 12 fold quantity of gasoline it had a melting point of 67–68° C.

The product can, for example, be converted to 2-amino-3-nitro-6-chloro-pyridine by reacting a solution containing 4 g. of such product in 60 ml. of alcohol with a solution from 2.2 g. of ammonium chloride and 1.6 g. NaOH dissolved in 15 ml. of water and heating the mixture after addition of a further 60 ml. of alcohol on a water bath for 2 hours.

2-amino-3-nitro-6-benzylamino-pyridine was prepared therefrom by adding such compound in a molar ratio of 1 to 4 to benzyl amine at 90° C. and then heating the mixture for 30 minutes at 100° C. The reaction mixture can then be dissolved in acetone and the desired product crystallized out by addition of a quantity of water sufficient to cause clouding.

2-amino-3-nitro - 6 - (m-trifluoromethyl-benzylamino)-pyridine can similarly be prepared from the 2-amino-3-nitro-6-chloro-pyridine by reacting with an equimolar quantity of m-trifluoromethyl-benzyl amine in n-propanol in the presence of potash as an acid acceptor.

The nitro group of these amino-nitro-benzyl-amino-pyridines can be reduced to the amino group by dissolving in dioxane and hydrogenating at about 20 atmospheres pressure in the presence of anhydrous sodium sulfate with the aid of Raney nickel.

The 2,3-diamino-6-benzyl-pyridines thus obtained can be acylated to the corresponding 2-amino-3-arylamino compounds by, for example, reacting solutions thereof with chloroformic acid ethyl ester, chloroformic acid propyl ester, acrylic acid chloride, propionyl chloride.

We claim:
1. 2,6-dichloro-3-nitro-pyridine.
2. A process of producing the product according to claim 1, 2,6-dichloro-3-nitro-pyridine, which comprises heating 2,6-dichloropyridine with a mixture of concentrated sulfuric acid and fuming nitric acid (d.=1.5) under reflux.
3. The process of claim 2 in which the volumetric ratio of the concentrated sulfuric acid and the fuming nitric acid in said mixture is 1:1 to 2:1.
4. A process according to claim 3 wherein the refluxing is carried out at 105–107° C.

References Cited

FOREIGN PATENTS 692,990  8/1965  Italy _____ 260—290

OTHER REFERENCES

Johnson, J. Chem. Soc. (B), 1967 (11), pp. 1204–1210.

Webster's New World Dictionary of the American Language, 2nd college ed., p. 1505 (World Publ. Co., N.Y.).

Elderfield, Heterocyclic Compounds, vol. 1, p. 540 (Wiley and Sons, New York) (1950).

HARRY I. MOATZ, Primary Examiner

U.S. Cl. X.R.

260—296 R